US012724437B2

(12) United States Patent
Da Costa et al.

(10) Patent No.: US 12,724,437 B2
(45) Date of Patent: Sep. 1, 2026

(54) PRESSURE REGULATOR AND DISK ASSEMBLY FOR A PRESSURE REGULATOR

(71) Applicant: EMERSON PROCESS MANAGEMENT REGULATOR TECHNOLOGIES, INC., McKinney, TX (US)

(72) Inventors: Andrew Da Costa, McKinney, TX (US); Ruben Longoria, Little Elm, TX (US); Bartley de la Houssaye, McKinney, TX (US); Tyler Gibson, McKinney, TX (US); Justin L. Masias, McKinney, TX (US); David O. Plummer, Irving, TX (US); James C. Hawkins, Allen, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 18/919,144

(22) Filed: Oct. 17, 2024

(65) Prior Publication Data

US 2026/0111047 A1 Apr. 23, 2026

(51) Int. Cl.
*G05D 16/06* (2006.01)

(52) U.S. Cl.
CPC ................................ *G05D 16/0638* (2013.01)

(58) Field of Classification Search
CPC ............. G05D 16/0638; G05D 16/068; G05D 16/0688; F16K 1/487; F16K 1/36; F16K 1/48

(Continued)

(56) References Cited

U.S. PATENT DOCUMENTS 1,250,433 A * 12/1917 Comings ................ F16K 1/487 251/88
1,595,786 A * 8/1926 Johnson ................. F16K 25/04 251/210

(Continued)

FOREIGN PATENT DOCUMENTS

BE 533 791 A 12/1954
GB 520 324 A 4/1940

(Continued)

OTHER PUBLICATIONS

International Search Report and Written Opinion for Application No. PCT/US2025/051205, dated Jan. 23, 2026.

*Primary Examiner* — Jessica Cahill
(74) *Attorney, Agent, or Firm* — MARSHALL, GERSTEIN & BORUN LLP

(57) ABSTRACT

A pressure regulator includes a body, a valve port, and a disk assembly that is movable between a closed position and an open position. The disk assembly includes a disk holder, a disk, and a retaining screw. The disk holder has a generally cylindrical side wall, a back wall extending radially inward from the side wall, and a retaining ledge extending radially inward from the side wall and generally parallel to the back wall. A disk is disposed within a cavity of the disk holder and has a back surface configured to a least partially engage an inner surface of the back wall and a front surface configured to at least partially engage an inner surface of the retaining ledge. A retaining screw extends through apertures in the disk and the disk holder and has a head configured to engage the front surface of the disk.

19 Claims, 6 Drawing Sheets

(58) Field of Classification Search
USPC .............................................. 251/84, 85, 87
See application file for complete search history.

(56) References Cited

U.S. PATENT DOCUMENTS

| | | | | |
|---|---|---|---|---|
| 2,088,666 | A * | 8/1937 | Portl | F16K 1/2042 251/85 |
| 2,103,576 | A | 12/1937 | Dockson | |
| 2,225,116 | A * | 12/1940 | Ilieff | F16K 1/36 251/357 |
| 2,522,732 | A * | 9/1950 | Whitworth | G05D 16/0688 251/84 |
| 3,885,589 | A * | 5/1975 | Iung | F16K 1/307 137/505.35 |
| 4,402,340 | A * | 9/1983 | Lockwood, Jr. | F16K 1/305 251/210 |
| 12,078,251 | B2 * | 9/2024 | Ma | F17C 13/04 |
| 2014/0076426 | A1 * | 3/2014 | Mevius | F16J 15/062 137/494 |
| 2014/0083513 | A1 * | 3/2014 | Zhou | F16K 31/165 251/213 |
| 2014/0090719 | A1 * | 4/2014 | Mevius | F16K 1/42 137/505.18 |
| 2018/0046204 | A1 | 2/2018 | Lin et al. | |

FOREIGN PATENT DOCUMENTS

| | | | | |
|---|---|---|---|---|
| GB | 596488 | A * | 1/1948 | F16K 1/487 |
| WO | WO-2014052720 | A1 * | 4/2014 | G05D 16/0694 |

* cited by examiner

PRESSURE REGULATOR AND DISK ASSEMBLY FOR A PRESSURE REGULATOR

FIELD OF THE DISCLOSURE

This disclosure relates generally to pressure regulators and, more particularly, to disk assemblies for pressure regulators.

BACKGROUND

Pressure regulators, sometimes referred to as fluid regulators, are commonly distributed throughout process control systems to control flow rates and/or pressures of various fluids (e.g., liquids, gases, etc.). Pressure regulators can be used to regulate the pressure of a fluid to a substantially constant value. Typically, a pressure regulator has an inlet that receives a supply of process fluid at a relatively high pressure and a disk assembly that interacts with a valve port in a fluid passageway of the pressure regulator to reduce the pressure to a relatively lower and/or substantially constant pressure at an outlet.

Some pressure regulators used in high pressure applications (e.g., greater than 1000 psi) use hard polymer (e.g., nylon, PTFE/PU, etc.) disks, which are durable and resistant to pull out, in the disk assembly. However, the hard polymer disks in these disk assemblies have poor lock-up performance and require a large pressure build-up over the set-point to achieve a bubble tight lock-up of the pressure regulator. In some cases, the hard polymer disk may not fully lock-up allowing a small amount of leakage, which may not be acceptable in many applications. In other pressure regulators, elastomer disks are used in the disk assembly, which have better lock up characteristics than hard polymer disks. However, elastomer disks are susceptible to disk chunking and pull out under high pressures and flow with current disk assembly designs and are typically rated to 1000 psi or less due to potential pull out and disk chunking at higher pressures.

BRIEF SUMMARY OF THE DISCLOSURE

In accordance with one example of the present invention, a pressure regulator comprises a valve body having an inlet and an outlet, a valve port disposed between the inlet and the outlet, and a disk assembly that is movable along a longitudinal axis between a closed position in which the disk assembly sealingly engages the valve port and an open position in which the disk assembly is spaced apart from the valve port. The disk assembly comprises a disk holder, a disk, and a retaining screw. The disk holder includes a generally cylindrical side wall, a back wall at a first end of the side wall and extending radially inward from the side wall, and a retaining ledge at a second end of the side wall, opposite the first end, and extending radially inward from the side wall and generally parallel to the back wall. The generally cylindrical side wall, the back wall, and the retaining ledge define a cavity. The disk is disposed within the cavity of the disk holder and has a back surface configured to at least partially engage an inner surface of the back wall and a front surface configured to at least partially engage an inner surface of the retaining ledge. The retaining screw extends through an aperture in the disk and an aperture in the disk holder and has a head configured to engage the front surface of the disk.

In further accordance with any one or more of the foregoing exemplary aspects of the present invention, the pressure regulator may further include, in any combination, any one or more of the following preferred forms.

In one preferred form, the disk is an elastomer material.

In another preferred form, a first portion of the disk is compressed between the back wall and the retaining ledge of the disk holder and a second portion of the disk is compressed between the back wall and the head of the retaining screw.

In another preferred form, the retaining ledge and the head of the retaining screw together cover more than 50% of the front surface of the disk.

In another preferred form, the retaining ledge is annular.

In another preferred form, the pressure regulator comprises an actuator coupled to the valve body and responsive to fluid pressure to move an actuator stem along the longitudinal axis.

In another preferred form, the retaining screw is threadably coupled to the actuator stem. The retaining screw comprises a bore extending longitudinally through the retaining screw and the bore in the retaining screw is in fluid communication with a bore in the actuator stem to provide fluid communication between the actuator and the valve body.

In accordance with another example of the present invention, a pressure regulator comprises a valve body having an inlet and an outlet, a valve port disposed between the inlet and the outlet, and a disk assembly that is movable along a longitudinal axis between a closed position in which the disk assembly sealingly engages the valve port and an open position in which the disk assembly is spaced apart from the valve port. The disk assembly comprises a disk holder and a disk. The disk holder includes a back wall and retaining ledge spaced apart from the back wall and extending generally parallel to the back wall. The disk is disposed within a cavity of the disk holder and has a back surface configured to at least partially engage an inner surface of the back wall and a front surface configured to at least partially engage an inner surface of the retaining ledge.

In further accordance with any one or more of the foregoing exemplary aspects of the present invention, the pressure regulator may further include, in any combination, any one or more of the following preferred forms.

In one preferred form, the disk holder comprises a generally cylindrical side wall extending between the back wall and the retaining ledge, the back wall extends radially inward from a first end of the side wall, and the retaining ledge extends radially inward from a second end of the side wall.

In another preferred form, the side wall, the back wall, and the retaining ledge define the cavity.

In another preferred form, the disk assembly comprises a retaining screw extending through an aperture in the disk and an aperture in the disk holder and having a head configured to engage the front surface of the disk.

In another preferred form, the retaining ledge and the head of the retaining screw together cover more than 50% of the front surface of the disk.

In another preferred form, the retaining screw is threadably coupled to an actuator stem of an actuator coupled to the valve body. The actuator is responsive to fluid pressure to move the actuator stem along the longitudinal axis. The retaining screw comprises a bore extending longitudinally through the retaining screw and the bore in the retaining screw is in fluid communication with a bore in the actuator stem to provide fluid communication between the actuator and the valve body.

In another preferred form, the disk is an elastomer material.

In another preferred form, a first portion of the disk is compressed between the back wall and the retaining ledge of the disk holder and a second portion of the disk is compressed between the back wall and the head of the retaining screw.

In another preferred form, the retaining ledge is annular.

In accordance with another exemplary aspect of the present invention, a disk assembly for a pressure regulator comprises a disk holder, a disk, and a retaining screw. The disk holder includes a generally cylindrical side wall, a back wall at a first end of the side wall and extending radially inward from the side wall, and a retaining ledge at a second end of the side wall, opposite the first end, and extending radially inward from the side wall and generally parallel to the back wall. The generally cylindrical side wall, the back wall, and the retaining ledge define a cavity. The disk is disposed within the cavity of the disk holder and has a back surface configured to a least partially engage an inner surface of the back wall and a front surface configured to at least partially engage an inner surface of the retaining ledge, where a first portion of the disk is compressed between the back wall and the retaining ledge. The retaining screw extends through an aperture in the disk and an aperture in the disk holder and has a head configured to engage the front surface of the disk.

In further accordance with any one or more of the foregoing exemplary aspects of the present invention, the disk assembly may further include, in any combination, any one or more of the following preferred forms.

In one preferred form, the disk is an elastomer material.

In another preferred form, a portion of the front surface of the disk is configured to engage a valve port of the pressure regulator in a closed position and to be spaced apart from the valve port in an open position and the retaining ledge and the head of the retaining screw together cover more than 50% of the front surface of the disk.

In another preferred form, the retaining ledge is annular.

DETAILED DESCRIPTION

The examples disclosed herein relate to pressure regulators and disk assemblies for pressure regulators that address the drawbacks noted above. The example pressure regulators and disk assemblies disclosed herein provide a disk assembly that is durable, resistant to pull out, have improved lock-up characteristics, and resist disk chunking, even under higher fluid pressures. The examples disclosed herein prevent disk chunking and pull-out issues by securing the disk in a stainless-steel disk holder with a retaining ledge and a retaining screw having an enlarged head. The disk holder and retaining screw encapsulate the disk and expose only a small annular ring of the disk that engages the valve port to open and close the regulator. The encapsulated disk is resistant to pull out and disk chunking (damage) since it is tightly held and only a small portion of the disk is expose to the flow. Therefore, in the disclosed examples, an elastomer disk can be used in high pressure applications (e.g., greater than 1000 psi) and provide a tight shut-off, improving upon the hard polymer disks that are used currently.

Figure 1:
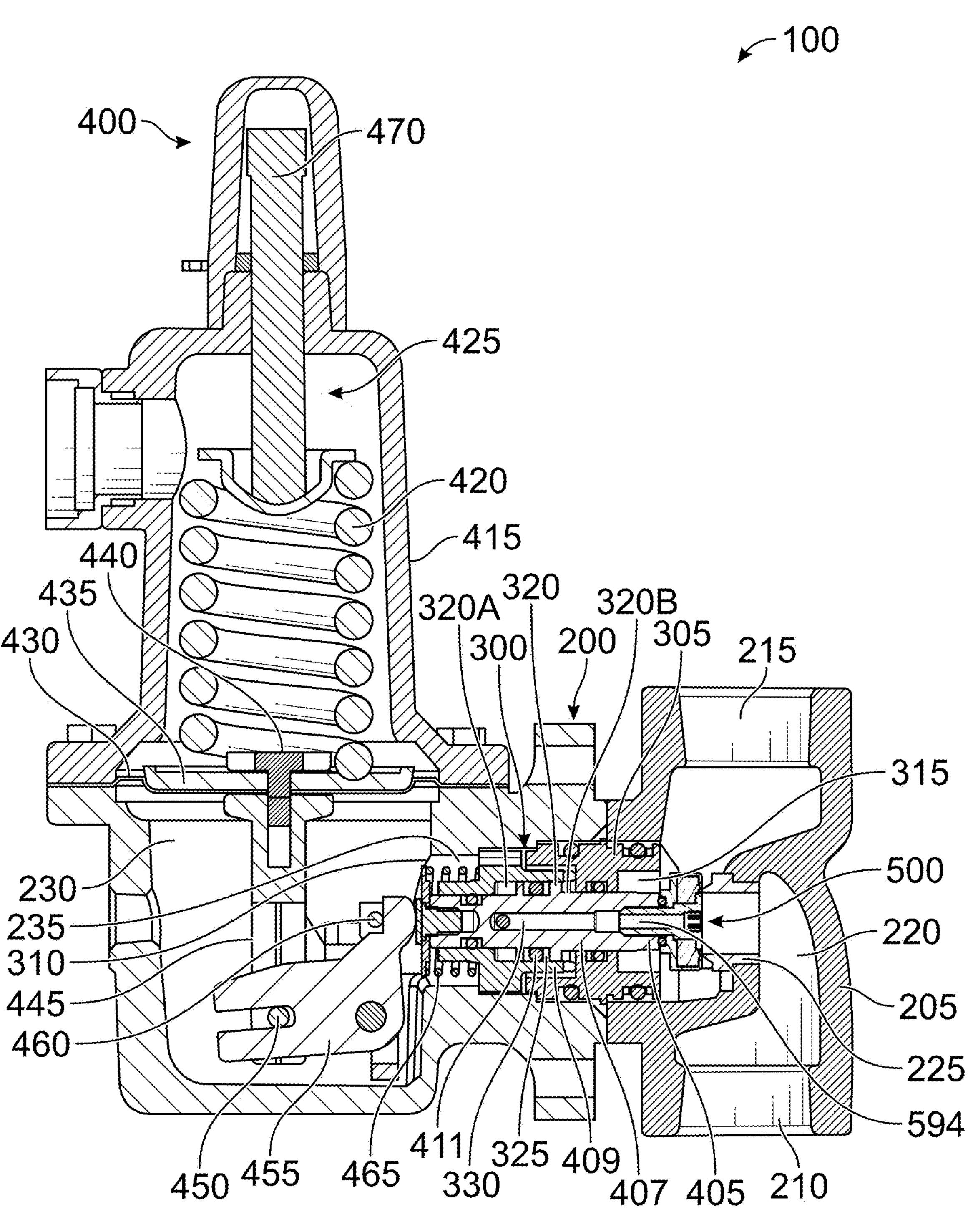
FIG. 1 illustrates a side cross-sectional view of an example pressure regulator.

Referring to FIG. 1, a cross-sectional view of an example pressure regulator 100 is illustrated. In the example shown, pressure regulator 100 includes a housing 200, which includes a valve body 205 that has an inlet 210, an outlet 215, and a fluid passageway 220 between inlet 210 and outlet 215. A valve port 225 is disposed in fluid passageway 220 between inlet 210 and outlet 215. In some examples, an upstream pipe can be coupled to valve body 205 at inlet 210 to provide fluid to valve body 205 and a downstream pipe can be coupled to valve body 205 at outlet 215 to provide reduced pressure fluid to a downstream location. Housing 200 also defines a pressure sensing chamber 230 and a channel 235 (e.g., an opening, a bore, etc.) between fluid passageway 220 and pressure sensing chamber 230.

Pressure regulator 100 also includes a stem assembly 300, which controls the flow of fluid through valve port 225 and, thus, between inlet 210 and outlet 215. Valve port 225 divides fluid passageway 220 into an upstream portion (upstream of valve port 225) and a downstream portion (downstream of valve port 225). Stem assembly 300 includes a disk assembly 500, described in more detail below. An actuator 400 is coupled to valve body 205 and is responsive to fluid pressure to move an actuator stem 405 and disk assembly 500 along a longitudinal axis 505. Pressure regulator 100 also includes a stem guide 305, where disk assembly 500 is coupled (e.g., rigidly coupled) to actuator stem 405. Actuator stem 405 is moveable (e.g., slidable) relative to stem guide 305 to move disk assembly 500 along longitudinal axis 505 toward or away from valve port 225, thereby controlling the flow of fluid through the valve port 225. Disk assembly 500 can be moved between a closed position (shown in FIG. 1) and an open position. In the open position, disk assembly 500 is spaced apart from the valve port 225, which allows fluid to flow from inlet 210 to outlet 215. In the closed position, disk assembly 500 sealingly engages valve port 225, which prevents and/or restricts fluid flow from inlet 210 to outlet 215. Pressure regulator 100 can move disk assembly 500 between the open and closed positions to regulate the pressure of the fluid downstream.

In the implementation shown in FIG. 1, stem guide 305 is disposed in channel 235 between pressure sensing chamber 230 and fluid passageway 220. Stem guide 305 is sealed relative to housing 200 to fluidly isolate the fluid in fluid passageway 220 and fluid in pressure sensing chamber 230. Stem guide 305 has a first side 310 and a second side 315 opposite first side 310. First side 310 faces pressure sensing chamber 230 and is exposed to pressure sensing chamber 230. Second side 315 faces fluid passageway 220 and is exposed to fluid passageway 220.

Housing 200 is coupled to a casing 415 of actuator 400, which includes a control spring 420. Control spring 420 is used to control or set the pressure at which pressure regulator 100 opens and closes. Control spring 420 is disposed in a control chamber 425 in spring casing 415. In some implementations, control chamber 425 can be open to the atmosphere. In other implementations, control chamber 425 can be pressurized with a fluid. In the example shown, actuator 400 includes a diaphragm 430 that separates control chamber 425 and pressure sensing chamber 230 and a diaphragm plate 435 that is coupled to diaphragm 430 via a diaphragm cap screw 440. Control spring 420 is engaged with diaphragm plate 435, which biases diaphragm plate 435 and diaphragm 430 toward pressure sensing chamber 230 (downward in FIG. 1). Diaphragm plate 435 is coupled to a pusher post 445 (e.g., via diaphragm cap screw 440), which includes a drive pin 450 that cooperates with a lever 455. Lever 455 is pivotably coupled to housing 200 and is coupled to a stem pin 460 that is coupled to actuator stem 405. As pusher post 445 moves up and down, pusher post 445 rotates lever 455, which moves actuator stem 405 linearly along longitudinal axis 505 in stem guide 305 (left and right in FIG. 1).

Pressure regulator 100 receives fluid at a first example pressure at inlet 210. In some implementations, pressure regulator 100 restricts and/or reduces flow of the fluid to outlet 215 based on a pressure of fluid at a downstream location, where the fluid at the downstream location is at a second example pressure. For example, when the second example pressure meets or exceeds a threshold pressure (e.g., a set pressure, a trigger pressure), pressure regulator 100 closes fluid passageway 220 to regulate the pressure of the fluid at the downstream location. The downstream location can be fluidly coupled to pressure sensing chamber 230, such that pressure sensing chamber 230 is at the second example pressure. In this implementation, pressure regulator 100 is an external sense pressure regulator, where pressure sensing chamber 230 is referenced to an external pressure. In such implementations, the pressure at the downstream location is fluidly coupled to pressure sensing chamber 230 via a fluid line (e.g., a hose, a pipe, a tube, etc.) coupled to and/or positioned in an opening (e.g., a fluid passage) in the housing 200. In some implementations, pressure regulator 100 can be an internal sense pressure regulator, where pressure sensing chamber 230 is referenced to the pressure of the fluid in the downstream portion. In such implementations, pressure regulator 100 can include one or more passages to fluidly couple the downstream portion of fluid passageway 220 and pressure sensing chamber 230.

When the second pressure in pressure sensing chamber 230 satisfies (e.g., is at or above) the threshold pressure, the second pressure overcomes the spring force of control spring 420 and forces diaphragm 430 upward in FIG. 1. As diaphragm 430 and diaphragm plate 435 move upward, pusher post 445 rotates lever 455 in a first direction (e.g., clockwise in FIG. 1). Lever 455 pushes actuator stem 405 to the right in FIG. 1, until disk assembly 500 engages valve port 225 to close and/or seal off fluid passageway 220 and, thus, reduce the pressure of the fluid at the downstream location. When the second pressure of the fluid in pressure sensing chamber 230 does not satisfy (e.g., is less than) the threshold pressure, the spring force of control spring 420 overcomes the second pressure and moves diaphragm 430 and diaphragm plate 435 downward in FIG. 1. As a result, pusher post 445 moves downward in FIG. 1 and rotates lever 455 in a second direction (e.g., counterclockwise in FIG. 1). In some implementations, a return spring 465 can bias actuator stem 405 back to the left in FIG. 1, such that disk assembly 500 moves away from valve port 225. Thus, the threshold pressure is based (at least partially) on the spring force from control spring 420. In some implementations, the spring force can be increased or decreased to change the threshold pressure to a desired pressure level. For example, an adjustment screw 470 can be adjusted to increase or decrease the compression of control spring 420 and, thus, change the force control spring 420 exerts on diaphragm 430.

In the example shown, the pressure of the fluid in the downstream portion of fluid passageway 220 is at a third example pressure. In some implementations, such as when disk assembly 500 is throttling (e.g., actively moving between the open and closed positions), the third example pressure may be substantially lower than the first example pressure. In other examples, such as when disk assembly 500 is held in the open position for a period of time, the third example pressure may be the same (or substantially the same) as the first example pressure (e.g., there may be a relatively small pressure drop across valve port 225). In some implementations, the second example pressure is substantially the same as the third example pressure. However, in other implementations, the second example pressure can be different from the third example pressure.

Because the first example pressure, second example pressure, and third example pressure may be different, pressure regulator 100 balances actuator stem 405 to reduce and/or eliminate the effect of the pressure differential on actuator stem 405 and disk assembly 500. In the example shown, actuator stem 405 has a stem body 407 and flange 409 extending radially from stem body 407. Stem guide 305 defines a balance chamber 320 and actuator stem 405 extends through stem guide 305, such that flange 409 is disposed in balance chamber 320. Flange 409 divides balance chamber 320 into a first balance chamber portion 320A and a second balance chamber portion 320B. In particular, flange 409 fluidly separates first balance chamber portion 320A and second balance chamber portion 320B. Flange 409 defines a seal gland 325 and a seal 330 positioned in seal gland 325 and engaged with an inner surface of stem guide 305 forming balance chamber 320. In some implementations, seal 330 fluidly isolates first balance chamber portion 320A and second balance chamber portion 320B.

A bore 411 (e.g., a balance port, a pressure registration port) is defined through actuator stem 405 and extends to first balance chamber portion 320A. A portion of bore 411 extends longitudinally through actuator stem 405 and another portion of bore 411 extends in a transverse direction to an outer surface of actuator stem 405. As such, when disk assembly 500 is in the open position, bore 411 fluidly couples the downstream portion of fluid passageway 220 and first balance chamber portion 320A. Therefore, the fluid in first balance chamber portion 320A is at the third example pressure (which may be the same as or similar to the first example pressure) when disk assembly 500 is in the open position. Conversely, when disk assembly 500 is in the closed position, bore 411 fluidly couples the upstream portion of fluid passageway 220 and first balance chamber portion 320A. As a result, the fluid in first balance chamber portion 320A is at the first example pressure when disk assembly 500 is in the closed position. In some examples, bore 411 can be formed by one or more openings or channels through one or more other structures.

Figure 2:
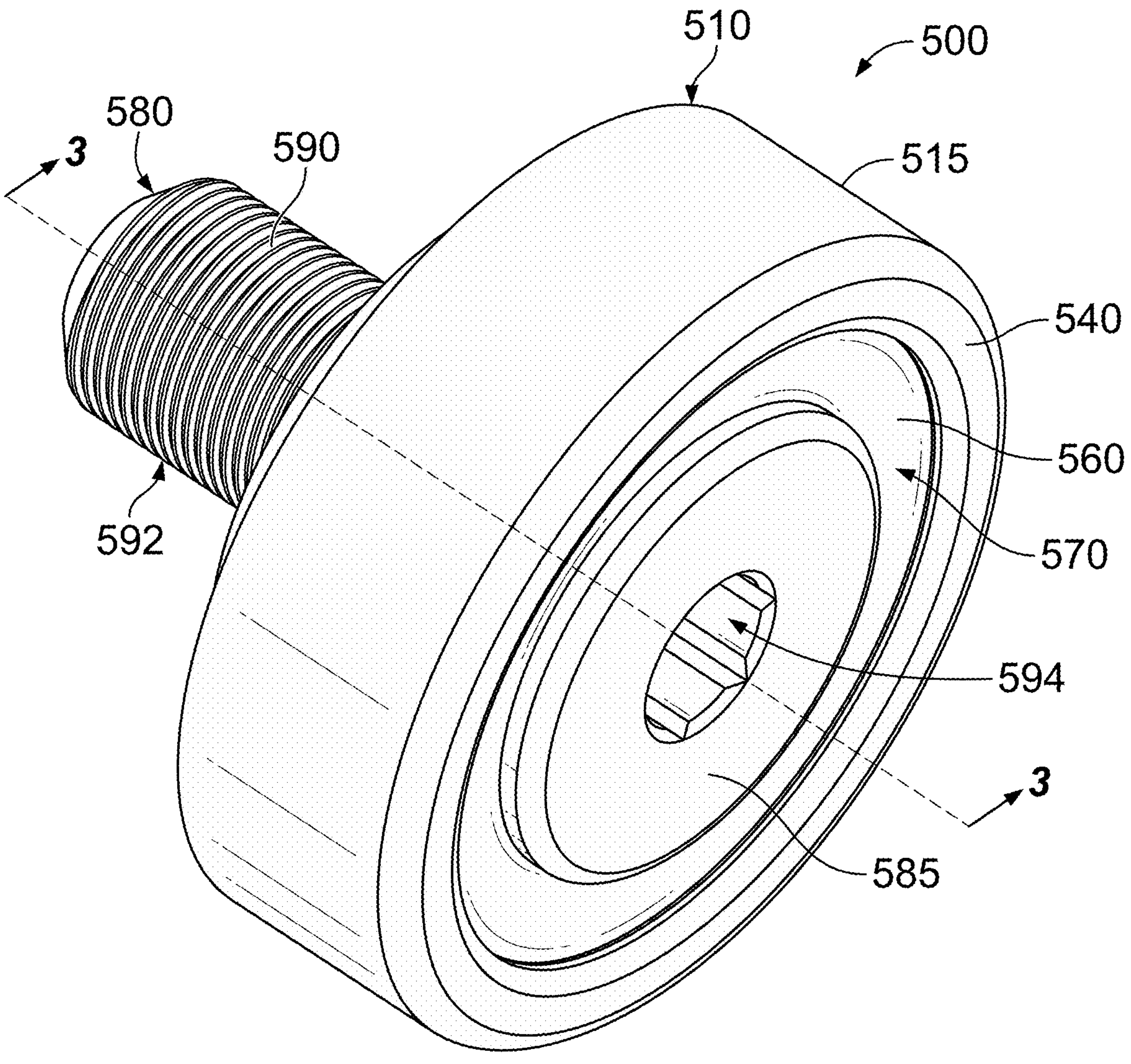
FIG. 2 illustrates a perspective view of an example disk assembly of the pressure regulator of FIG. 1.
Figure 3:
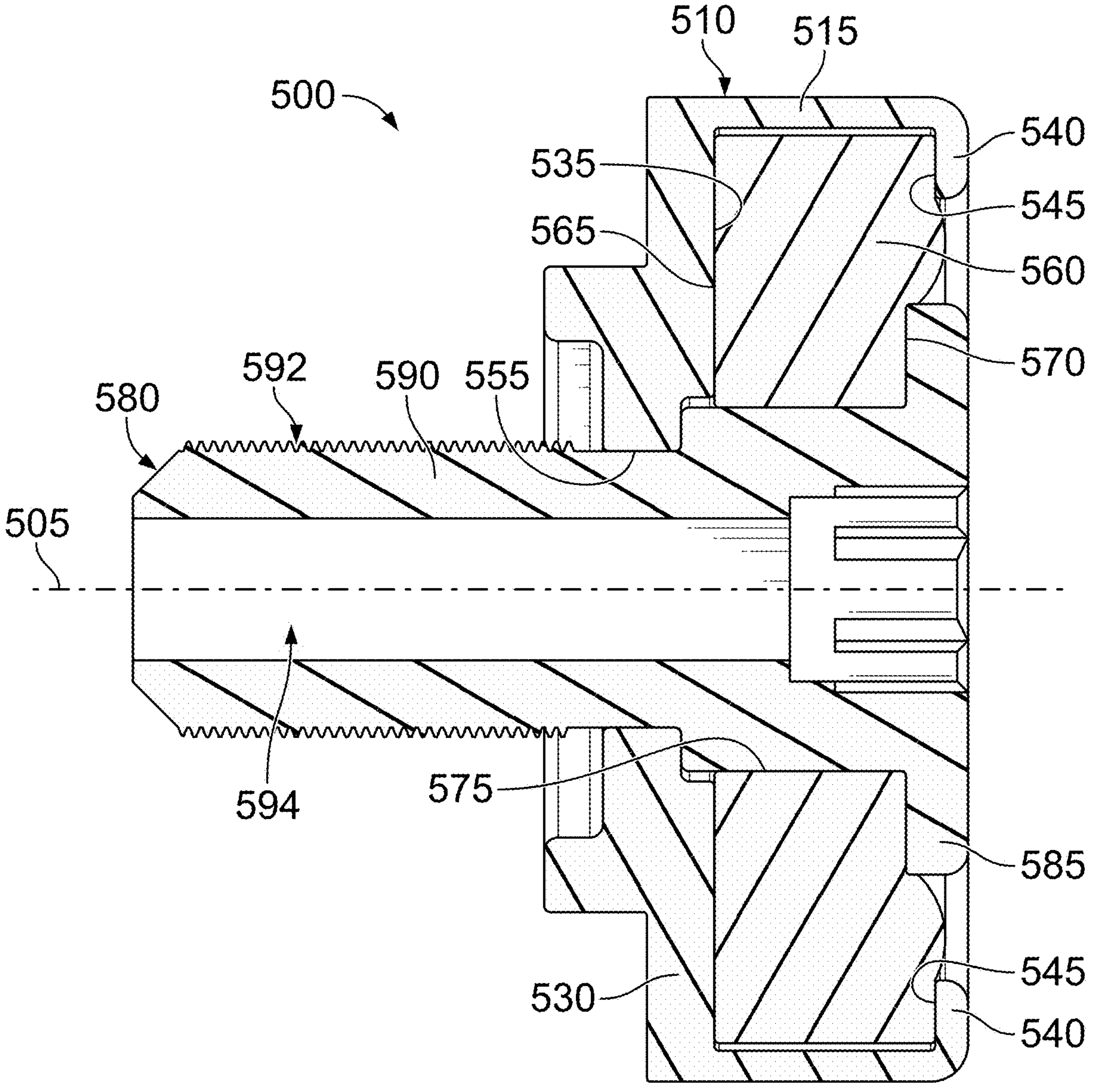
FIG. 3 illustrates a side cross-sectional view of the disk assembly of FIG. 2, taken along line 3-3 in FIG. 2.

Referring to FIGS. 2-3, disk assembly 500 of pressure regulator 100 of FIG. 1 is illustrated. Disk assembly 500 generally includes a disk holder 510, a disk 560 disposed within disk holder 510, and a retaining screw 580 that retains disk 560 in disk holder 510.

Figure 4:
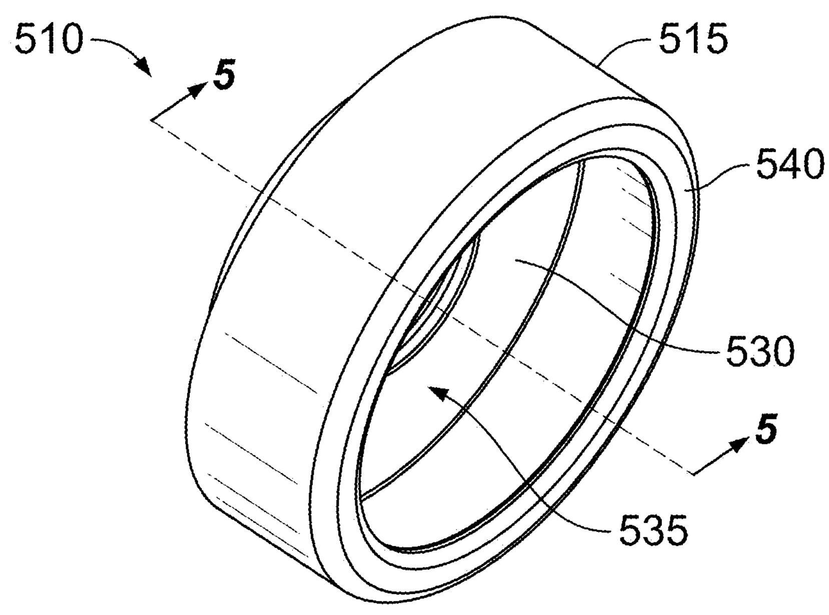
FIG. 4 illustrates a perspective view of an example disk holder of the disk assembly of FIG. 2.
Figure 5:
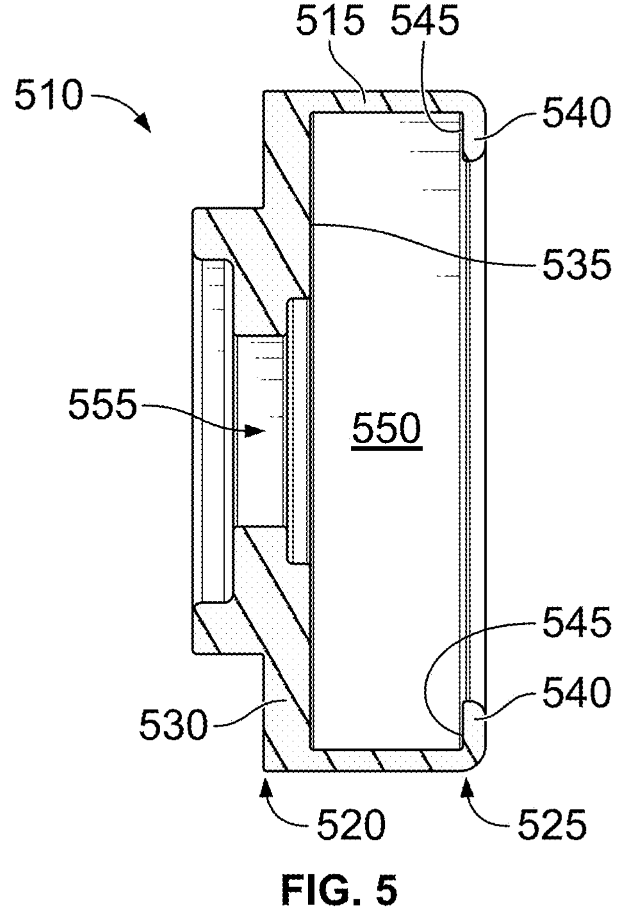
FIG. 5 illustrates a side cross-sectional view of the disk holder of FIG. 4, taken along line 5-5 in FIG. 4.

As shown in FIGS. 4-5, disk holder 510 of disk assembly 500 generally includes a generally cylindrical side wall 515, a generally planar back wall 530, and a retaining ledge 540 spaced apart from back wall 530, which together define a cavity 550 in disk holder 510. Back wall 530 is at a first end 520 of generally cylindrical side wall 515 and extends radially inward from generally cylindrical side wall 515. Retaining ledge 540 is at a second end 525 of generally cylindrical side wall 515, opposite first end 520, and extends radially inward from generally cylindrical side wall 515 and generally parallel to back wall 530. In some implementations, generally cylindrical side wall 515 of disk holder 510 can have an outer diameter of approximately 22 mm and retaining ledge 540 can extend radially inward from generally cylindrical side wall 515 approximately 6 mm. In the implementation shown, retaining ledge 540 is annular and extends continuously around the circumference of generally cylindrical side wall 515. In other implementations, retaining ledge 540 could include multiple, disconnected arcuate sections that each extending radially inward from generally cylindrical side wall 515. As shown, disk holder 510 is a single, integral, unitary part. In other implementations, disk holder 510 could be multiple parts (e.g., separate side wall, back wall, and retaining ledge) that are secured together (e.g., welded).

Figure 6:
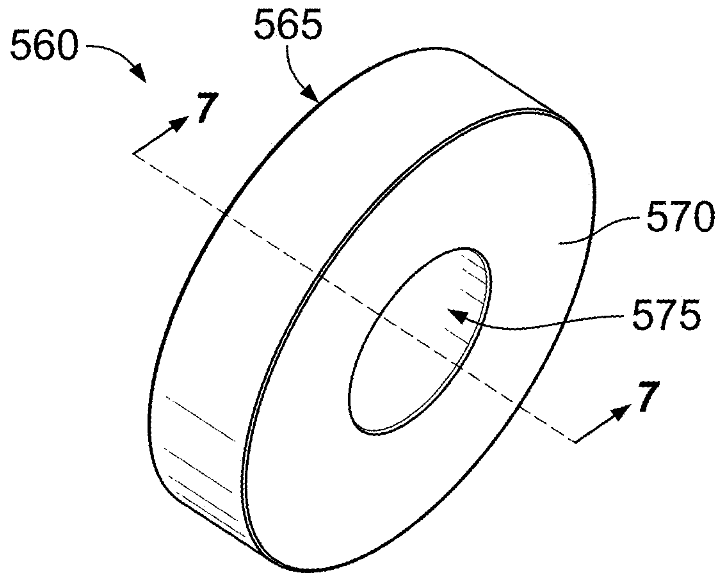
FIG. 6 illustrates a perspective view of an example disk of the disk assembly of FIG. 2.
Figure 7:
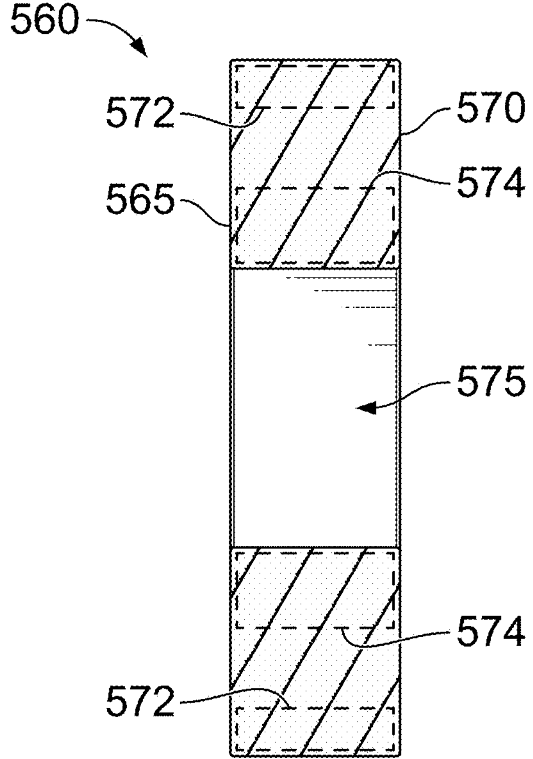
FIG. 7 illustrates a side cross-sectional view of the disk of FIG. 6, taken along line 7-7 in FIG. 6.

Disk 560 is disposed within cavity 550 of disk holder 510. As shown in FIGS. 6-7, disk 560 is annular and has a generally planar back surface 565 that is configured to at least partially engage an inner surface 535 of back wall 530 and a front surface 570 that is configured to at least partially engage an inner surface 545 of retaining ledge 540, such that a first portion 572 of disk 560 (e.g., an annular radially outer portion) is compressed between back wall 530 and retaining ledge 540 of disk holder 510. In the implementations shown, disk 560 is an elastomer material. In other implementations, disk 560 could be a hard polymer (e.g., nylon, PTFE/PU, etc.) material, or other materials as appropriate for a given application, and can have other dimensions, as required.

Figure 8:
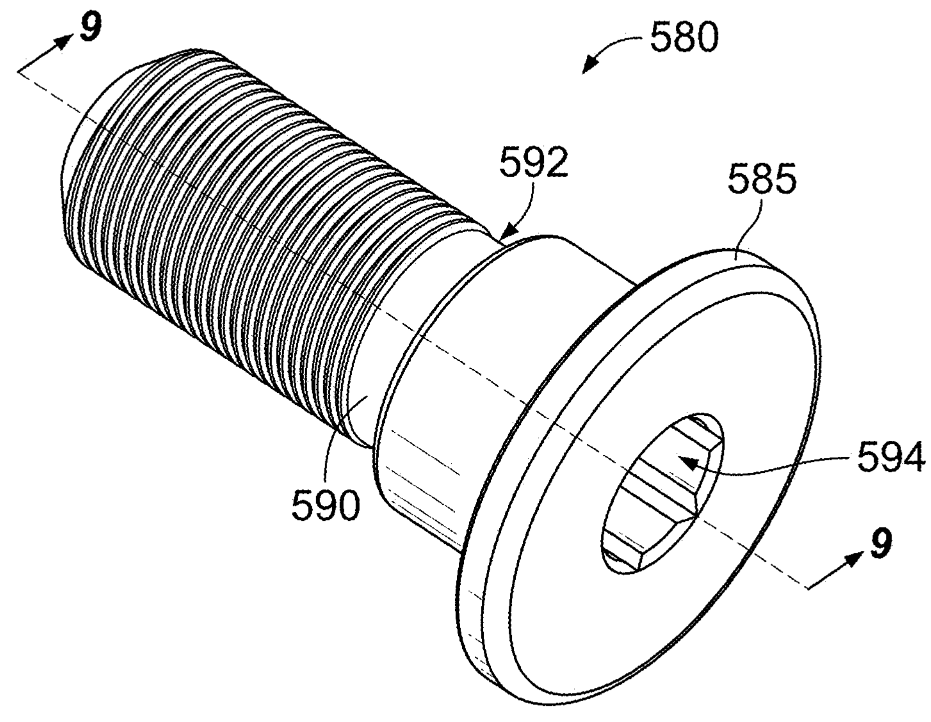
FIG. 8 illustrates a perspective view of an example retaining screw of the disk assembly of FIG. 2.
Figure 9:
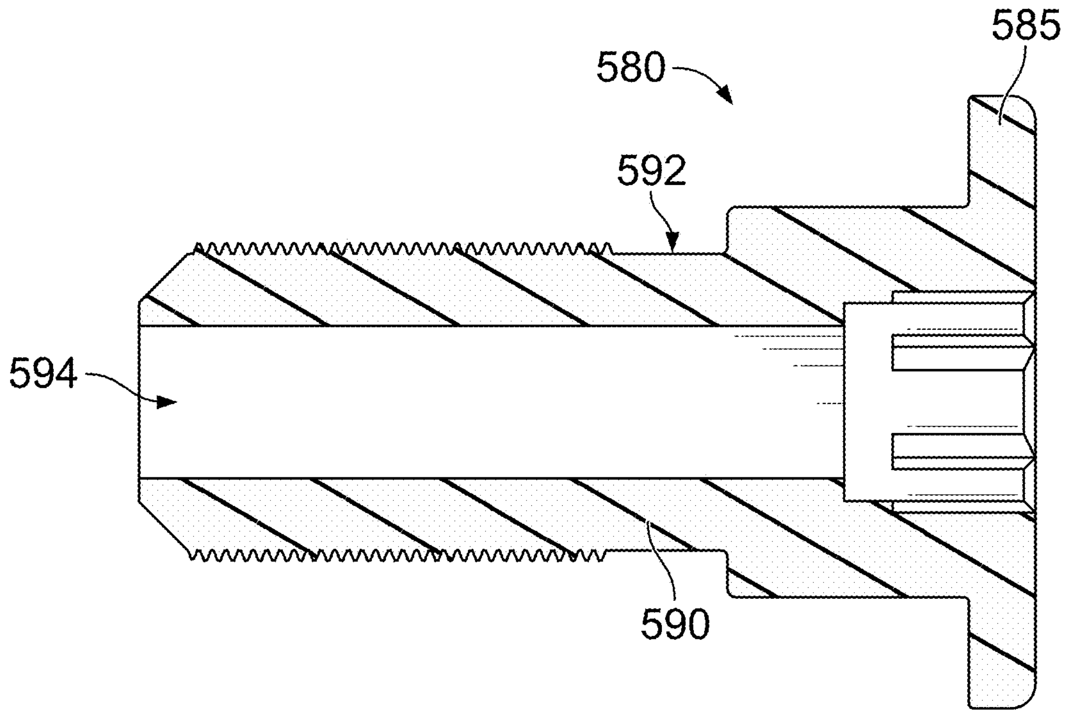
FIG. 9 illustrates a side cross-sectional view of the retaining screw of FIG. 8, taken along line 9-9 in FIG. 8.

Retaining screw 580 extends through an aperture 575 in disk 560 and an aperture 555 in disk holder 510. As shown in FIGS. 8-9, at least a portion of an outer surface 592 of a body 590 of retaining screw 580 is threaded so that retaining screw 580 can be threadably coupled to actuator stem 405. Retaining screw 580 also comprises a bore 594 that extends longitudinally through retaining screw 580 and that is in fluid communication with actuator 400 and valve body 205 to provide fluid communication between fluid passageway 220 of housing 200 and bore 411 in actuator stem 405 of actuator 400 through retaining screw 580. Retaining screw 580 has a head 585 that extends radially from a body 590 and is configured to engage front surface 570 of disk 560, such that a second portion 574 of disk 560 (e.g., a radially inner portion) is compressed between back wall 530 of disk holder 510 and head 585 of retaining screw 580 (see, e.g., FIG. 2). The compression of the first portion 572 of disk 560 between retaining ledge 540 and back wall 530 of disk holder 510 and the longitudinal compression of the second portion 574 of disk 560 between head 585 of retaining screw 580 and back wall 530 of disk holder 510 retains disk 560 within disk holder 510 and prevents pull out. The longitudinal compression of the second portion 574 of disk 560 between head 585 of retaining screw 580 and back wall 530 of disk holder 510 also radially compresses disk 560 between generally cylindrical side wall 515 of disk holder 510 and body 590 of retaining screw 580. In some implementations, head 585 of retaining screw 580 can have an outer diameter of approximately 12.8 mm and head 585 of retaining screw 580 and retaining ledge 540 of disk holder 510 cover more than 50% of the area of front surface 570 of disk 560. In the implementation shown, head 585 of retaining screw 580 and retaining ledge 540 of disk holder 510 cover 55-65% of the area of front surface 570 of disk 560. Minimizing the area of the front surface of the disk that is encountered by the fluid flow through the pressure regulator can minimize chunking and other damage to the disk.

The figures and description provided herein depict and describe one example for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular examples and applications have been illustrated and described, it is to be understood that the disclosed examples are not limited to the precise construction and components disclosed herein. Various modifications, changes, and variations, which will be apparent to those skilled in the art, may be made in the arrangement, operation and details of the methods and components disclosed herein without departing from the spirit and scope defined in the appended claims.

What is claimed is:

1. A pressure regulator, comprising:

a valve body having an inlet and an outlet;

a valve port disposed between the inlet and the outlet;

a disk assembly that is movable along a longitudinal axis between a closed position in which the disk assembly sealingly engages the valve port and an open position in which the disk assembly is spaced apart from the valve port; and an actuator coupled to the valve body and responsive to fluid pressure to move an actuator stem along the longitudinal axis, wherein the disk assembly comprises:

a disk holder including a generally cylindrical side wall, a back wall at a first end of the side wall and extending radially inward from the side wall, and a retaining ledge at a second end of the side wall, opposite the first end, and extending radially inward from the side wall and generally parallel to the back wall, the generally cylindrical side wall, the back wall, and the retaining ledge defining a cavity;

a disk disposed within the cavity of the disk holder, the disk having a back surface configured to a least partially engage an inner surface of the back wall and a front surface configured to at least partially engage an inner surface of the retaining ledge; and a retaining screw extending through an aperture in the disk and an aperture in the disk holder, the retaining screw having a head configured to engage the front surface of the disk, and wherein the retaining screw comprises a bore extending longitudinally through the retaining screw, and wherein the bore in the retaining screw is in fluid communication with a bore in the actuator stem to provide fluid communication between the actuator and the valve body.

2. The pressure regulator of claim 1, wherein the disk is an elastomer material.

3. The pressure regulator of claim 1, wherein a first portion of the disk is compressed between the back wall and the retaining ledge of the disk holder and a second portion of the disk is compressed between the back wall and the head of the retaining screw.

4. The pressure regulator of claim 1, wherein the retaining ledge and the head of the retaining screw together cover more than 50% of the front surface of the disk.

5. The pressure regulator of claim 1, wherein the retaining ledge is annular.

6. The pressure regulator of claim 1, wherein: the retaining screw is threadably coupled to the actuator stem.

7. The pressure regulator of claim 1, wherein an annular ring of the front surface of the disk is configured to engage with the valve port when the disk assembly is in the closed position.

8. A pressure regulator, comprising:

a valve body having an inlet and an outlet;

a valve port disposed between the inlet and the outlet; and a disk assembly that is movable along a longitudinal axis between a closed position in which the disk assembly sealingly engages the valve port and an open position in which the disk assembly is spaced apart from the valve port;

wherein the disk assembly comprises:

a disk holder including a back wall and retaining ledge spaced apart from the back wall and extending generally parallel to the back wall;

a disk disposed within a cavity of the disk holder, the disk having a back surface configured to a least partially engage an inner surface of the back wall and a front surface configured to at least partially engage an inner surface of the retaining ledge; and a retaining screw having a head configured to engage the front surface of the disk, and wherein an annular ring of the front surface of the disk is configured to engage with the valve port when the disk assembly is in the closed position, wherein the retaining ledge and the head of the retaining screw together cover more than 50% of the front surface of the disk, and wherein: the retaining screw is threadably coupled to an actuator stem of an actuator coupled to the valve body, the actuator being responsive to fluid pressure to move the actuator stem along the longitudinal axis; the retaining screw comprises a bore extending longitudinally through the retaining screw; and the bore in the retaining screw is in fluid communication with a bore in the actuator stem to provide fluid communication between the actuator and the valve body.

9. The pressure regulator of claim 8, wherein: the disk holder comprises a generally cylindrical side wall extending between the back wall and the retaining ledge; the back wall extends radially inward from a first end of the side wall; and the retaining ledge extends radially inward from a second end of the side wall.

10. The pressure regulator of claim 9, wherein the side wall, the back wall, and the retaining ledge define the cavity.

11. The pressure regulator of claim 8, wherein the retaining screw extends through an aperture in the disk and an aperture in the disk holder.

12. The pressure regulator of claim 8, wherein the disk is an elastomer material.

13. The pressure regulator of claim 8, wherein a first portion of the disk is compressed between the back wall and the retaining ledge of the disk holder and a second portion of the disk is compressed between the back wall and the head of the retaining screw.

14. The pressure regulator of claim 8, wherein the retaining ledge is annular.

15. A disk assembly for a pressure regulator having a valve body and an actuator with an actuator stem, the disk assembly comprising:

a disk holder including a generally cylindrical side wall, a back wall at a first end of the side wall and extending radially inward from the side wall, and a retaining ledge at a second end of the side wall, opposite the first end, and extending radially inward from the side wall and generally parallel to the back wall, the generally cylindrical side wall, the back wall, and the retaining ledge defining a cavity;

a disk disposed within the cavity of the disk holder, the disk having a back surface configured to a least partially engage an inner surface of the back wall and a front surface configured to at least partially engage an inner surface of the retaining ledge, wherein a first portion of the disk is compressed between the back wall and the retaining ledge; and a retaining screw extending through an aperture in the disk and an aperture in the disk holder, the retaining screw having a head configured to engage the front surface of the disk, wherein the retaining screw comprises a bore extending longitudinally through the retaining screw, and wherein the bore in the retaining screw is configured to be in fluid communication with a bore in the actuator stem to provide fluid communication between the actuator and the valve body.

16. The disk assembly of claim 15, wherein the disk is an elastomer material.

17. The disk assembly of claim 15, wherein: a portion of the front surface of the disk is configured to engage a valve port of the pressure regulator in a closed position and to be spaced apart from the valve port in an open position; and the retaining ledge and the head of the retaining screw together cover more than 50% of the front surface of the disk.

18. The disk assembly of claim 15, wherein the retaining ledge is annular.

19. The disk assembly of claim 15, wherein an annular ring of the front surface of the disk is configured to engage with a valve port when the disk assembly is in a closed position.

* * * * *